United States Patent [19]

Chay et al.

[11] 4,284,601

[45] Aug. 18, 1981

[54] SURFACTANT FOAMS AND THEIR USE

[75] Inventors: Dong M. Chay; David J. Haack, both of Wilmington, Del.

[73] Assignee: E. I. Du Pont de Nemours and Company, Wilmington, Del.

[21] Appl. No.: 178,783

[22] Filed: Aug. 18, 1980

[51] Int. Cl.$^3$ .......................... B01J 11/18; C09K 3/00
[52] U.S. Cl. ...................................... 422/40; 252/382; 252/384
[58] Field of Search ............... 252/153, 547, 382, 384; 422/40

[56] References Cited

U.S. PATENT DOCUMENTS

| | | | |
|---|---|---|---|
| 2,748,078 | 5/1956 | Perri et al. | 252/8.05 |
| 3,258,423 | 6/1966 | Tuve et al. | 252/3 |
| 3,458,274 | 7/1969 | Cashman et al. | 252/384 |
| 3,562,156 | 2/1971 | Francen | 252/8.05 |
| 3,954,662 | 5/1976 | Salyer et al. | 252/382 |

*Primary Examiner*—William J. Van Balen

[57] ABSTRACT

Aqueous foam compositions comprising water and a mixture of ammonium lauryl sulfate, methyl polyoxyethylene cocoamine chloride, dimethyl cocoamine oxide and polyvinyl alcohol are used to suppress the formation of fumes from fumable materials by covering the material with said compositions in the form of foam, thereby causing the material to react with the water to prevent fume release.

15 Claims, No Drawings

SURFACTANT FOAMS AND THEIR USE

DESCRIPTION

1. Technical Field

This invention relates to certain aqueous compositions and a method of using them in the form of a stable foam to prevent certain fumable materials from fuming when exposed to the atmosphere.

2. Background Art

In processes that involve the use of materials which result in heavy release of fumes on exposure to the atmosphere, there is a need for methods of handling such materials without releasing polluting fumes into the atmosphere. These materials tend to produce visible fumes when exposed to humidity. Even though the boiling point at atmospheric pressure of such materials may be high, they will vaporize and fume when exposed to the atmosphere. Spillages of such materials whether they occur from an overfilling of containers, equipment failures, leaks, failure of flanges, valves, pumps or other equipment break-in and cleaning must be handled so as to prevent atmospheric pollution.

U.S. Pat. No. 3,954,662 discloses aqueous foamable compositions which can be used to suppress coal dust. The foamable compositions are made up of interpolymers of (a) a polymerizable vinyl ester and (b) a partial ester compound interpolymerizable therewith which bind the coal dust and give body to the foam.

U.S. Pat. No. 3,562,156 discloses compositions used for forming a tough and durable film on the surface of LiPuid hydrocarbons that will suppress vaporization of the hydrocarbons into the air, e.g., liquid hydrocarbon fumes. The compositions comprise water-soluble fluoroaliphatic surfactant, a water-soluble synthetic imputrescible hydrocarbon-congruous organic fluorine-free surfactant and water. Fluorosurfactants, however, are relatively expensive and tend to reduce the life of foams prepared therefrom. The fluorine-free surfactant is known for its ability to wet but such a property is not essential in preparing foams that will suppress the fuming involved in the present invention.

SUMMARY OF THE INVENTION

Now a surfactant composition has been found that when applied in the form of foam over fumable materials that have been exposed to the atmosphere will substantially reduce or eliminate fume formation therefrom.

A thick blanket of the acid resistant aqueous surfactant composition of this invention in the form of foam, when applied over the present fumable materials, was found to quench the fumes that tend to evolve. Some fume puff breakthroughs can occur with time but they are usually minimal and do not result in material fume releases. However, even these breakthroughs of fume can be eliminated by an occasional reapplication of foam.

What is meant by fumable material is a liquid or solid that is water soluble and hydrolyzable that upon exposure to the atmosphere releases visible fumes. The fumable materials of this invention are selected from the group consisting of $NH_3$ (anhydrous), $TiCl_4$, $SiCl_4$, $PCl_3$, $POCl_3$, $VOCl_3$, $AlCl_3$ and $H_2SiF_6$. The fumable materials of this invention to which the fume suppression properties of the foams of this invention are most frequently applicable are $TiCl_4$, $SiCl_4$ and $PCl_3$. The present foams are especially effective with $TiCl_4$.

It is believed that the high density foams of this invention are effective in minimizing fumes because the water present in the foam hydrolyzes the fumable materials slowly as the water drains from the foam. The slow rate of hydrolysis reduces the fuming and these reduced fumes are then absorbed as they rise through the bed of foam. The thickness of the foam bed is reduced with time, as water continues to drain leading to the bubble break-up. When this occurs, the fumes are not absorbed as effectively, resulting in fume breakthroughs. The fume breakthroughs are prevented by applying more foam to restore the foam blanket. Since the foams have good acid attack resistance, foam breakdown is minimized, thereby providing maximum foam life.

The important features of an effective aqueous foam for suppressing fuming of anhydrous materials are that water must drain slow enough from the foam to prevent a rapid fume release. The foam also must possess a certain degree of chemical inertness toward the fumable material to prevent it from a ready structural breakdown.

The acid resistant aqueous surfactant foams of this invention comprise a mixture of the following surfactants ammonium lauryl sulfate (ALS), methyl polyoxyethylene cocoamine chloride (MPOECAC), dimethyl cocoamine oxide (DMCAO) and polyvinyl alcohol (PVA). Aqueous solutions of the above constituents, when prepared in ratios described herein, give foams with sufficient life to effectively quench fumes from the present anhydrous materials. The pH of the mixture solutions range from 5.5–8.0 depending on the amounts of each component used.

Foam can be made by mixing dilute solutions with air or by mixing concentrated solutions with air and water. What is meant by dilute solutions is a mixture of ALS, MPOECAC, DMCAO, PVA and sufficient water to form the desired foam without additional water. What is meant by concentrated solutions is a mixture of ALS, MPOECAC, DMCAO and PVA with water that would require additional water to form the desired foam. A foam generator consists of a pump and a nozzle. The solution mixture is pumped to a nozzle through which air or air and water are added. The solution and the air or air and water are intimately mixed in the generator as they flow through packing material. The foam produced is then thrown out for use in accordance with the invention.

The foams made from the foam solution of the invention can have various consistencies, from relatively stiff foam, like shaving cream to a somewhat runny type like shaving cream with excess liquid or the highly fluffy type like bubble bath foam. The consistency depends on the amount of water and air used with the above constituent mixture. Different consistency foams can also be made by using different types of foam generating devices and methods known in the art. Generally speaking, foams that are "runny" are the least desirable for fume quenching applications. Water from such foams drains too rapidly and results in a rapid rate of fume release which can break through the foam blanket. Water from low density foams that are fluffy drains too slowly to neutralize the anhydrous material so that much of said material is left unhydrolyzed.

The foam of this invention may vary in density in the range of 0.005–0.130 g/cc, preferably 0.02–0.07 g/cc. Generally speaking, the higher the ratio of the air to the foam solution used, the lower the density of the foam. Other factors affecting the foam densities are the concentration of foam solution, and the mixing extent of the foam solution and air.

The effectiveness of fume quenching suffers at both ends of the density scale. The runny type high density foams hydrolyze the fumable material effectively but too rapidly. This causes surges of fumes leading to fume breakthroughs. The low density fluffy type foams drain water too slowly. Thus, the time required for the quenching is prolonged and the foam wash down with water can cause fuming due to the remaining unhydrolyzed fumable materials. In addition, the fluffy foams have the drawback that they can be blown away by wind more readily and thus expose the fumable material to the atmosphere.

The acid resistant foam of this invention is defined as a foam which, due to its acid attack resistance, results in the maximization of foam life. Such a foam does not undergo a rapid deterioration on exposure to the present fumable material. A foam having a good acid attack resistance will mitigate fumes rapidly, when applied on the present fumable materials. In most cases only one application of foam is enough to reduce or stop fumes. However, when large amounts of fumable material are involved, reapplications may be required to prevent the fume breakthroughs.

The acid resistant foam compositions of this invention comprise ammonium lauryl sulfate (ALS), methyl polyoxyethylene cocoamine chloride (MPOECAC), polyvinyl alcohol (PVA) and dimethyl cocoamine oxide (DMCAO) in the proportions indicated below with sufficient water to yield the correct density foam.

| (In Parts by Weight Based on 100% Purity) | | | |
|---|---|---|---|
| ALS | MPOECAC | PVA | DMCAO |
| 7-35 | 25-55 | 2.5-7.5 | 20-35 |

The above compositional ranges were determined by quenching fumes from the present fumable materials. The above ranges resulted in sufficient foam life and inorganic halide neutralization to reduce or substantially eliminate fuming. The use of less than the minimum composition levels given generally reduces the foam life risking increased fume breakthroughs. Greater than the upper levels do not materially improve the foam properties but merely result in higher costs.

Each component of the above composition is first dissolved in water before being mixed with the other components to make the foamable composition. The aqueous concentration of the components must be in the range indicated below:

| Percent by Weight of the Component in Water Based on 100% Purity | | | |
|---|---|---|---|
| ALS | MPOECAC | PVA | DMCAO |
| 0.34-50 | 1.21-95 | 0.12-7 | 0.97-35 |

The concentration may be in the more concentrated end of the range given in which case water may be added after mixing to form a foam. The concentration may be in the more dilute end of the range in which case no further water will be added before making the foam. Thus the acid resistant foam of this invention can be prepared in a dilute solution makeup or a concentrated solution makeup. The dilute solution is a foam solution that has already been diluted with water ready for use. The concentrated solution requires a diluton with water during foam preparation.

An important element of the foam generation is the proper mixing of the foam solution with air. The foam solution develops foam on a vigorous mixing with air. Such a mixing can be accomplished by pumping the foam solution through an on-line mixer nozzle. The nozzle is filled with steel wool, or with small particle size packing material that will promote mixing with air without an excessive pressure drop. Air is blown into the foam solution ahead of the nozzle. As the foam solution and the air flow through the winding paths of the nozzle, they mix and produce foam which is thrown out the nozzle. For this type of foam generation, both a dilute foam solution and a concentrated foam solution can be used. When using a concentrated solution, water must be metered in to insure satisfactory foams.

Foam can be made by an "eductor" type foam generator without the use of a forced air addition. Usually a concentrated solution is used with an eductor because of the water used by the eductor. The eductor draws up the concentrated solution by means of pressurized water from a water pipe or a fire hydrant. The concentrated solution is diluted with the water in the hose and flows to a spray nozzle. The rushing water draws in air through the perforations around the nozzle with the solution and the air mixing in the nozzle to make foam. Experiences show that as compared to the foams made by other systems, the foams made with the eductor type generator are "runny" due partly to the poorer mixing of the foam solution and the air.

A rapid and safe way to use foam for quenching liquid $TiCl_4$ fumes is to roll it. A mound of foam should be accumulated first a few feet away from the spill area. It would then be rolled (or pushed) with the stream of foam from the nozzle to cover the $TiCl_4$ spill. This method minimizes a potential liquid $TiCl_4$ splattering which would result in increased fuming. Foam can be applied directly on the $TiCl_4$ area, however, if the spill is minor and if there is no standing liquid $TiCl_4$.

Another way to avoid splattering liquid $TiCl_4$ spills is to direct the foam against a wall and let fall onto the spill area. This technique is less convenient for lack of a ready availability of a wall.

In the examples that follow the acid resistant foam compositions of this invention and their use toward reducing atmospheric fuming of fumable materials are further illustrated. All foam applications in the examples were carried out at ambient temperature.

EXAMPLES

Example 1

The acid resistant foam solution of the composition given in the table was used to prepare a foam that had 0.030 g/cc foam density. Foam was made by the "pump" type method wherein the pumping rate of the foam solution and the air flow rate were 450 cc/min and 20,000 cc/min respectively. The foam generator nozzle used was a 4.45 cm OD×25.4 cm in length pipe which was filled loosely with 1.7 gm household pot scouring steel wool. The two ends of the pipe were closed with caps that each had 1.27 cm OD×15.24 cm in length pipe nipple on the middle. The foam was sprayed over 50 ml anhydrous liquid TiCl$_4$ on a 25 cm×25 area of a porcelain enamel pan.

The 8 cm thick foam subsided to 5 cm after 3 minutes of soaking during which only 2 small puffs of fume were released. After a total of 10 minutes soaking, the foam was washed out with water without fuming.

A 50 ml anhydrous liquid TiCl$_4$ on a 25 cm×25 cm area of a porcelain enamel pan was treated with water as a control run to compare to the use of the above foam. Water was applied at 1.4 1/min through a 0.7 mm ID Tygon ® tube. A white plume formed immediately above the TiCl$_4$. There was some splattering. After 13 seconds, fuming stopped at which time water addition was stopped.

Example 2

A concentrated acid resistant foam solution, after 2 months storage at room temperature, was diluted with water in the proportion shown in the table that follows. The fume quenching test was repeated as in Example 1 with similar results.

Example 3

A concentrated foam solution of the composition given in the table that follows, after 1 month storage at room temperature, was used to quench 3.5 liters anhydrous TiCl$_4$ poured on a 1 meter diameter area of concrete. Foam was made from the concentrated solution by the "eductor" type foam generator wherein a fire hydrant was used for the water source. The water had a 4.5 kg/cm$^2$ gauge pressure and 290 1/min flow rate. The concentrated solution eduction rate was 4.5 1/min. The fuming stopped as soon as the entire spill area was covered which required about 20 seconds. Several small fume puffs broke through toward the end of the 3 minute soak period. An additional short foam application was made to smother the breakthrough. The foam was water cleaned with a minimal fuming after a 10 minute soaking. The density of foam was 0.07 g/cc.

Example 4

This example describes the use of foam for cleaning the plant process TiCl$_4$ equipment. The foam was made from a dilute foam solution of the composition given in the table that follows. The foam had a density of 0.043 g/cc. The solution was pumped at 800 cc/min and the air flow rate was 45,000 cc/min. The foam generator nozzle was of a similar construction described in Example 1 except bigger.

The nozzle dimensions are 6.35 cm OD×38 cm in length with 2.54 cm OD×15 cm in length nipples on the end caps. It was filled with 6.2 gm steel wool. The foam was sprayed into a heat exchanger tube bundle containing residual TiCl$_4$. After removing the connection flanges to the heat exchanger, the foam was sprayed into the top cap (or "bell") of the 3.05 meters diameter vertical shell and tube heat exchanger. Very little fuming resulted during the foam spray as opposed to the copious fuming that occurs on cleaning with water. After all the heat exchanger tubes were wetted down by pumping in the foam continuously for 20 minutes, the foam was allowed to soak for 1 hour. The heat exchanger was finally opened to atmosphere by removing the top cap and washed down with water with minimal fuming.

Example 5

This example describes the use of the acid resistant foam solution of this invention for the purpose of mitigating atmospheric fume releases resulting from the exposure of anhydrous liquid SiCl$_4$. The foam generator used was of the same type as in Example 1. A foam solution of the composition given in the table that follows was pumped at a rate of 650 cc/min with an air flow rate of 30,000 cc/min. The foam obtained (0.034 g/cc density) was sprayed over 50 ml anhydrous liquid SiCl$_4$ in a 25 cm×25 cm area of a porcelain enamel pan. The foam bed subsided to 5 cm thickness from the original 6.5 cm after 3 minutes of soaking during which no fume breakthrough occurred. After a total of 10 minutes soaking, the foam and pan were washed down with water without fuming.

Example 6

This example describes the use of the acid resistant foam solution of this invention for the purpose of mitigating atmospheric fume releases resulting from the exposure of anhydrous liquid PCl$_3$. The foam generator used was of the same type described in Example 1. A foam solution of the composition shown in the table that follows was pumped at a rate of 600 cc/min with an air flow rate of 25,000 cc/min. The foam obtained (0.028 g/cc density) was sprayed over 50 ml anhydrous liquid PCl$_3$ in a 25 cm×25 cm area of a procelain enamel pan. The foam bed subsided to 5 cm thickness from the original 6.5 cm after 3 minutes of soaking during which no fume breakthrough occurred. After a total of 10 minutes soaking, the foam and pan were washed down with water without fuming.

EXAMPLES 1–6

FOAM SOLUTION COMPOSITION AND TYPE APPLICATIONS

FOAM COMPOSITION (Amounts in Parts by Weight)

| Example | ALS[1] | MPOECAC[2] | PVA[3] | DMCAO[4] | Water |
|---------|--------|------------|--------|----------|-------|
| 1 | 55 | 55 | 70 | 100 | 2000 |
| 2 | 55 | 55 | 70 | 100 | 2000 |
| 3 | 30 | 30 | 100 | 75 | 0 |
| 4 | 30 | 40 | 150 | 100 | 2000 |
| 5 | 15 | 25 | 75 | 120 | 2000 |
| 6 | 70 | 55 | 50 | 90 | 2000 |

FUME QUENCHING

| Example | Chemical | Type Application | Type Foam Generation |
|---------|----------|------------------|----------------------|
| 1 | TiCl$_4$ | Spill | Pump[5] |
| 2 | TiCl$_4$ | Spill | Pump |
| 3 | TiCl$_4$ | Spill | Eductor[6] |
| 4 | TiCl$_4$ | Heat Exchanger | Pump |
| 5 | SiCl$_4$ | Spill | Pump |
| 6 | PCl$_3$ | Spill | Pump |

[1] Ammonium lauryl sulfate, 47% by weight concentration in water.
[2] Methyl polyoxyethylene cocoamine chloride with 15 oxyethylene groups, 95% by weight concentration in water.
[3] Polyvinyl alcohol, 5% by weight aqueous solution of Elvanol ® 71-30, by Du Pont Company.
[4] Dimethyl cocoamine oxide, 30% by weight concentration in water.
[5] Foam is made by the "pump type" wherein the foam solution is pumped and simultaneously air is added separately, as in Example 1.
[6] For the "eductor type" foam generation, high pressure water is used to suck up the foam concentrate.

INDUSTRIAL APPLICABILITY

As is apparent from the above, the foam of the invention is industrially applicable to preventing fuming where spills occur or where equipment is opened for cleaning where the fumable material of the present invention is involved.

We claim:

1. A method of preventing fumes from a fumable material that has been exposed to the atmosphere from escaping in the atmosphere comprising covering the fumable material with a foam prepared from a composition which comprises an aqueous mixture of ammonium lauryl sulfate, methyl polyoxyethylene cocoamine chloride, dimethyl cocoamine oxide and polyvinyl alcohol in a proportion in parts by weight, 100% basis, of 7–35, 25–55, 20–35 and 2.5–7.5, respectively with enough water and air to give foam density of from 0.005–0.130 g/cc.

2. The method of claim 1 wherein the fumable material is titanium tetrachloride.

3. The method of claim 1 wherein the fumable material is silicon tetrachloride.

4. The method of claim 1 wherein the fumable material is phosphorous trichloride.

5. The method of claim 1 wherein the foam density is 0.02–0.07 g/cc.

6. The method of claim 5 wherein the fumable material is titanium tetrachloride.

7. The method of claim 5 wherein the fumable material is silicon tetrachloride.

8. The method of claim 5 wherein the fumable material is phosphorous trichloride.

9. The method of claim 1 wherein the percent by weight aqueous concentration of the mixture is 0.34–50% of ammonium lauryl sulfate, 1.21–95% methyl polyoxyethylene, 0.97–35% dimethyl cocoamine oxide and 0.12–7% polyvinyl alcohol.

10. The method of claim 9 wherein the foam density is 0.02–0.07 g/cc.

11. The method of claim 9 wherein the fumable material is titanium tetrachloride.

12. The method of claim 9 wherein the fumable material is silicon tetrachloride.

13. The method of claim 9 wherein the fumable material is phosphorous trichloride.

14. A foamable composition for preventing fuming of fumable materials when exposed to the atmosphere comprising an aqueous mixture of ammonium lauryl sulfate, methyl polyoxyethylene cocoamine chloride, dimethyl cocoamine oxide and polyvinyl alcohol in a proportion in parts by weight of 7–35, 25–55, 20–35 and 2.5–7.5, respectively.

15. The composition of claim 14 wherein percent by weight of aqueous concentration of the mixture is 0.34–50% of ammonium lauryl sulfate, 1.21–95% methyl polyoxyethylene, 0.97–35% dimethyl cocoamine oxide and 0.12–7% polyvinyl alcohol.

* * * * *